July 18, 1939.  J. R. GAMMETER  2,166,810
ICE CREAM SCOOP
Filed Jan. 4, 1936
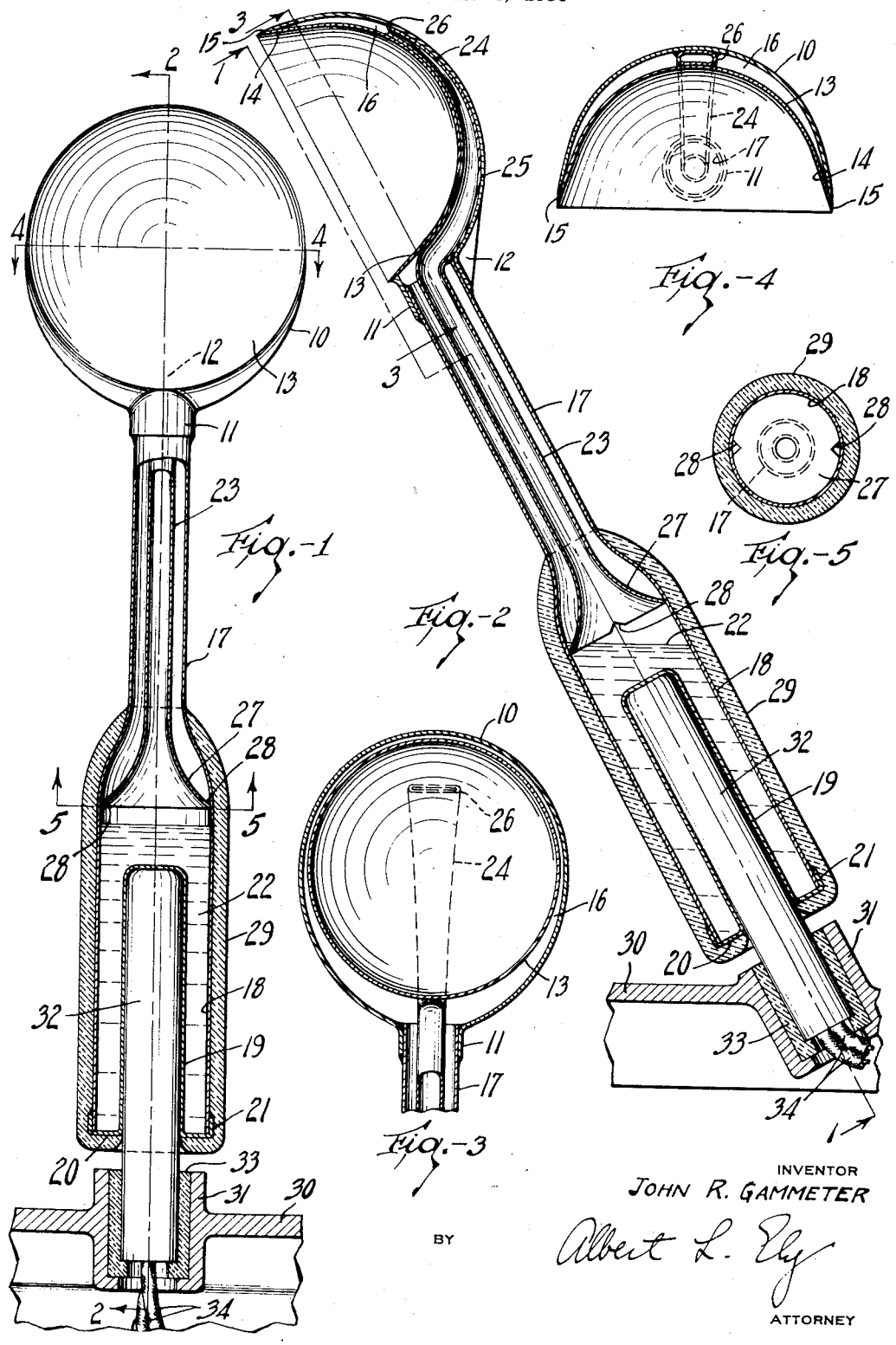
INVENTOR
JOHN R. GAMMETER
BY
Albert L. Ely
ATTORNEY Patented July 18, 1939

2,166,810

UNITED STATES PATENT OFFICE 2,166,810

ICE CREAM SCOOP

John R. Gammeter, Akron, Ohio

Application January 4, 1936, Serial No. 57,551

5 Claims. (Cl. 107—48)

This invention relates to improvements in ice cream scoops and has for its primary object to produce a scoop which is simple in construction, inexpensive to manufacture and efficient in operation.

Scoops available and in use at the present time are unsatisfactory in operation due principally to the fact that it is difficult to discharge the ice cream after the scoop has been filled by the usual way of dipping it into a container of ice cream. The ice cream, being frozen, resists the scoop and wherein a movable discharge member is provided it very often requires considerable strength to operate the same, especially when the ice cream is very hard. Furthermore, the discharge member is easily broken rendering the scoop useless. Other types of scoops are available which are not entirely satisfactory.

A further object of the present invention is therefore to provide a scoop which is capable of being heated and retaining the heat so that when the scoop is submerged in a container of ice cream the latter will not adhere to the inner wall of the scoop, thereby permitting unrestricted discharge of the ice cream into a receptacle or cone.

A further object of the invention is to provide a scoop of the type referred to which does not have any connected wires or the like which would otherwise interfere with the scooping operation.

With the objects above indicated and other objects hereinafter explained in view, the invention consists of the construction and combination of elements hereinafter described and claimed.

Referring to the drawing,

Figure 1 is a view of a scoop embodying the present invention taken on line 1—1 in Figure 2 and being partly in section;

Figure 2 is a longitudinal sectional view taken on line 2—2 in Figure 1;

Figure 3 is a sectional view taken on line 3—3 in Figure 2;

Figure 4 is a transverse sectional view taken line 4—4 in Figure 1;

Figure 5 is a transverse sectional view taken on line 5—5 in Figure 1.

In the drawing, I have illustrated an ice cream scoop embodying the present invention but should not be limited thereto inasmuch as the invention may be embodied in various constructions best suited for its particular purpose. A steel casting is provided which comprises an outer cupped member 10 having a tubular extension 11 projecting laterally from one side thereof. A reinforcing rib 12 is provided which is formed integral with the extension and cup-shaped member as more clearly shown in Figures 1 and 2. An inner cup-shaped member 13 is provided which has a smooth inner surface and is adapted to contain the dished or scooped ice cream. The marginal portion 14, of course, tapers off slightly from the radius on which the inner cup-shaped member is formed so as to permit the scooped ice cream to be readily discharged. The inner cup-shaped member 13 is positioned within the outer cup-shaped member 10 and the two are welded together ot 15 along their outer contacting edges to provide a unitary structure, the inner member 13 being spaced from the outer member 10 progressively from a point opposite the extension 11 toward the latter as more clearly shown in Figure 2. This provides a fluid chamber 16 for a purpose to be later described.

A tubular member 17 has one end fitting within the extension 11 and is welded or otherwise secured thereto while the opposite end has an enlarged portion 18 to provide a hand grip. A tubular member 19 having its inner end closed is inserted axially within the enlarged portion 18 and has its opposite end bent laterally at 20 so as to close the adjacent end of the enlarged portion 18, there being provided on the lateral portion 20 a circumferential flange 21 of a suitable diameter to receive the end of the enlarged portion 18 and to which it is welded or otherwise secured. A heat responsive and retaining fluid 22, such as mercury or oil, is introduced into the enlarged portion 18 before the tubular member 19 is welded or secured thereto.

A tube 23 extends axially within the tubular member 17 in spaced relation therewith and has its outer end progressively flattened at 24 and bent at 25 to fit securely within the chamber 16, the outer end terminating at 26. This tube 23, of course, is flattened and bent before the inner cup-shaped member 13 is placed in position and welded and may therefore, if desired, be welded or otherwise secured to the inner surface of the outer cup-shaped member 10. The opposite or inner end of the tube 23 is flared outwardly at 27 to engage the inner wall of the tubular member 18 which maintains the tube in proper position, there being provided V-shaped notches 28 on diametrically opposite sides of flanged portion 27 to permit the fluid 22 to pass thereby. The size of these notches may be varied so as to control the rate of flow of the fluid.

An insulating material 29 is provided about the enlarged portion 18 and may be vulcanized or otherwise secured thereto which provides a suitable hand grip by which the scoop may be handled.

Any suitable support may be provided for the scoop, but I have shown one type which comprises a base 30 having a tubular projection 31 extending angularly with respect to said base as more clearly shown in Figure 2.

A heating element 32 has its inner end disposed within the projection 31 and an insulating bushing 33 is provided between the projection and heating element so that heat will not be transmitted to said base. The outer end of the heating element 32 extends outwardly from the base and is adapted to removably receive the scoop, the heating element being normally disposed within the tubular member 19. Conductor lines 34 are connected to the heating element in any well-known manner and with a source of current supply. A thermostat (not shown) may be introduced into the electrical circuit to maintain the temperature of the heating element at any desired degree such as 150° F.

In the operation of the device, it is assumed that the scoop is in the position shown in Figure 2. The current is turned on and the heating element 32 becomes heated to a temperature of approximately 150° F. This heat is transmitted to the liquid 22 and the scoop is then removed from the heating element by means of the hand grip. The opposite end of the scoop is then forced into a container of ice cream to fill the inner cup-shaped member 13. This causes the scoop to be inverted from the position shown in Figure 2 which results in the liquid flowing from the enlarged portion 18 through the center of the tube 23 around the bent portion 25 and out through the end 26 which fills the chamber 16 with heated liquid. This in turn heats the wall of the inner cup-shaped member 13 and prevents the ice cream from sticking or adhering thereto so that the scooped cream may be readily discharged. The flow of liquid is, of course, retarded by the restricted passages 28 through which the entrapped liquid is caused to pass and the flow of liquid, therefore, can be controlled. The liquid retains its heat long enough to permit several scoops of ice cream to be made before it is returned to the heating element to be reheated in the manner heretofore explained. Most of the liquid will return to the enlarged portion 18 through the passageway provided between the inner tube 23 and the outer tube 17. The scoop is normally placed on an agle so that any melted cream remaining in the inner cup-shaped member 13 will drain off from the lower edge.

While I have described the preferred embodiment of the invention, it should be understood that I am not to be limited thereto inasmuch as changes and modifications may be resorted to without departing from the spirit of the invention as defined in the appended claims.

What is claimed is:

1. An ice cream scoop comprising a dish-shaped portion adapted to receive the ice cream and having an enclosed fluid chamber therein extending over a portion thereof, a hand-grip portion having an enclosed chamber therein adapted to contain a heat-responsive fluid, an intermediate portion having its opposite ends connected respectively with said dish-shaped portion and said hand-grip portion and having a passageway therethrough communicating with the respective chambers to permit the flow of fluid therebetween, and a member having a passageway therein also communicating with the respective chambers, said member extending through said intermediate portion.

2. An ice cream scoop comprising a dish-shaped portion adapted to receive the ice cream and having an enclosed fluid chamber therein extending over a portion thereof, a hand-grip portion having an enclosed chamber therein adapted to contain a heat-responsive fluid, a tubular intermediate member having its opposite ends connected respectively with said dish-shaped portion and said hand-grip portion so that the respective chambers are in communication, and a second tubular member arranged in said first tubular member to provide at least two passageways between said chambers, one of which provides for the flow of the major portion of fluid in one direction and the other of which provides for the flow of the major portion of the fluid in the opposite direction.

3. An ice cream scoop comprising a dish-shaped portion adapted to receive the ice cream and having an enclosed fluid chamber therein extending over a portion thereof, a hand-grip portion having an enclosed chamber therein adapted to contain a heat-responsive fluid, a tubular intermediate member having its opposite ends connected respectively with said dish-shaped portion and said hand-grip portion so that the respective chambers are in communication, and a tube extending through said tubular member and having one end communicating with the chamber in said hand-grip portion and its opposite end projecting into the chamber in said dish-shaped portion whereby the major portion of the fluid is compelled to flow through said tube in its passage to the chamber in said dish-shaped portion.

4. An ice cream scoop comprising a dish-shaped portion adapted to receive the ice cream and having an enclosed fluid chamber therein extending over a portion thereof, a hand-grip portion having an enclosed chamber therein adapted to contain a heat-responsive fluid, a tubular intermediate member having its opposite ends connected respectively with said dish-shaped portion and said hand-grip portion so that the respective chambers are in communication, and a tube extending through said tubular member and having one end flared outwardly for engagement with the inner wall of the latter, said flared end having an opening therethrough, the opposite end projecting into the chamber in said dish-shaped portion, whereby the major portion of the fluid is compelled to flow through said tube in its passage to the chamber in said dish-shaped portion.

5. An ice cream scoop comprising a dish-shaped portion adapted to receive the ice cream and having an enclosed fluid chamber therein extending over a portion thereof, a hand-grip portion having an enclosed chamber therein adapted to contain a fluid capable of flowing into said first-mentioned chamber, a passageway connecting said chambers and through which the major portion of said fluid will flow during passage from the second-mentioned chamber into the first-mentioned chamber, and a second passageway connecting said chambers and through which the major portion of said fluid will flow during its return to said second-mentioned chamber.

JOHN R. GAMMETER.